Figure 1:
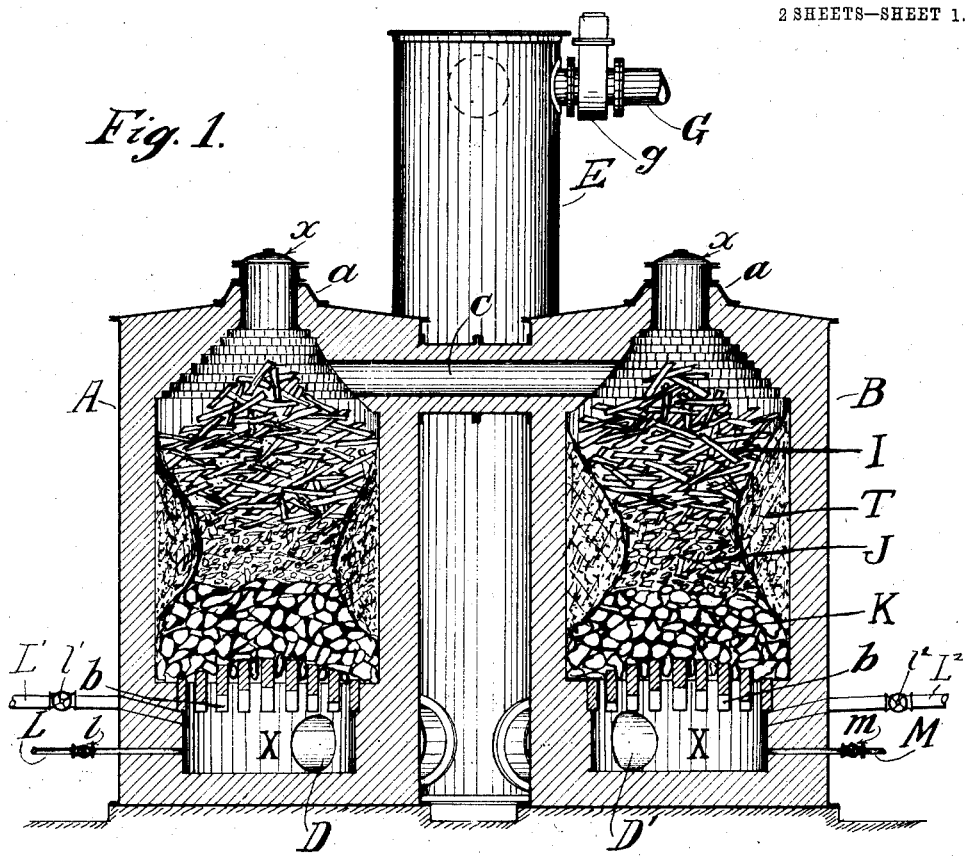

B. LOOMIS & H. PETTIBONE.
PROCESS OF MANUFACTURING GAS FROM WOOD.
APPLICATION FILED NOV. 24, 1903.

927,418.

Patented July 6, 1909.

Witnesses
Wm Boyd
M. R. M. Frayser

Inventors
Burdett Loomis
Hawley Pettibone
By E. H. Clark
Attorney

B. LOOMIS & H. PETTIBONE.
PROCESS OF MANUFACTURING GAS FROM WOOD.
APPLICATION FILED NOV. 24, 1903.
927,418.
Patented July 6, 1909.
2 SHEETS—SHEET 2.
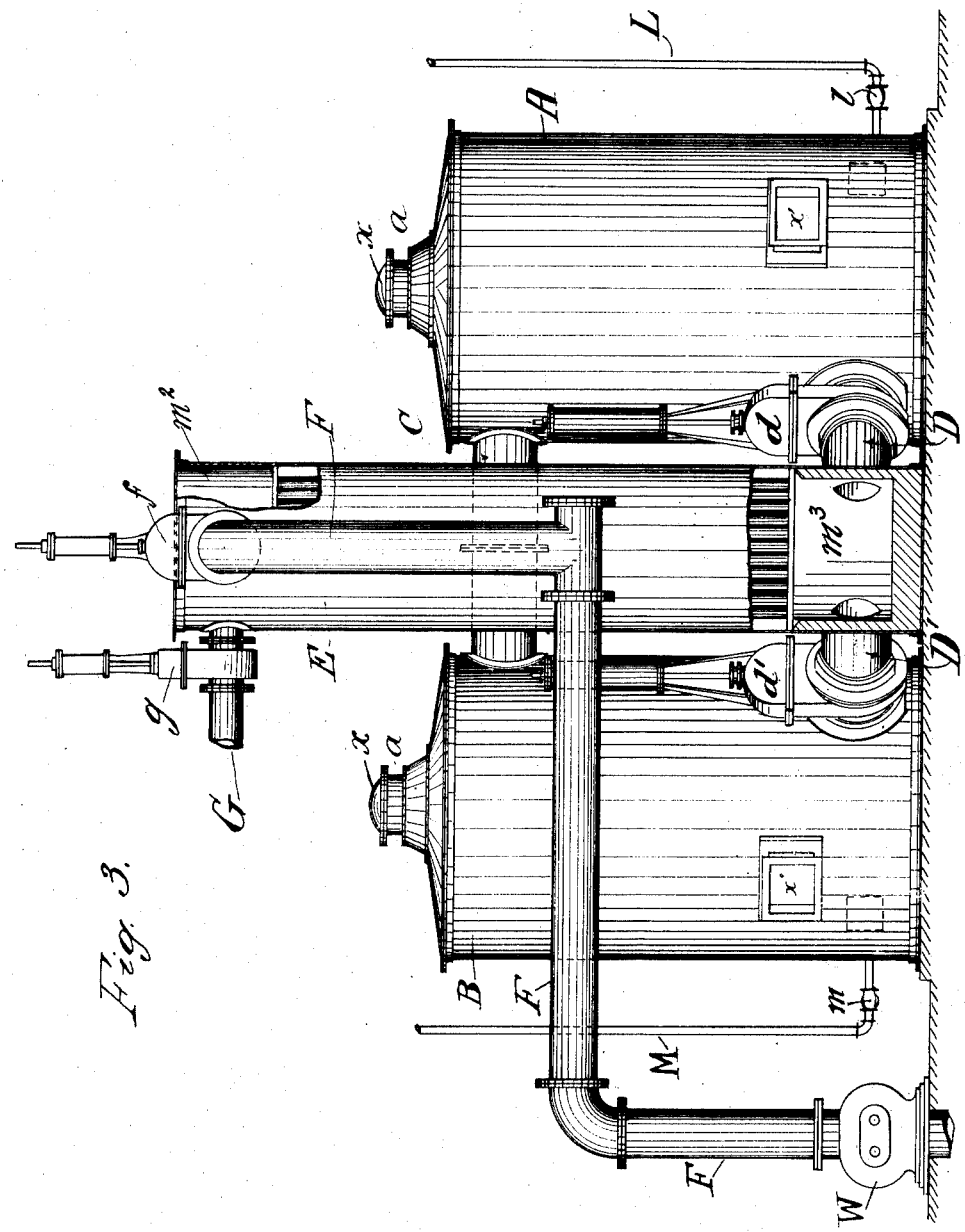

UNITED STATES PATENT OFFICE.

BURDETT LOOMIS, OF HARTFORD, CONNECTICUT, AND HAWLEY PETTIBONE, OF NEW ROCHELLE, NEW YORK, ASSIGNORS TO POWER AND MINING MACHINERY COMPANY, A CORPORATION OF NEW JERSEY.

PROCESS OF MANUFACTURING GAS FROM WOOD.

No. 927,418.  Specification of Letters Patent.  Patented July 6, 1909.

Application filed November 24, 1908. Serial No. 182,433.

*To all whom it may concern:*

Be it known that we, BURDETT LOOMIS and HAWLEY PETTIBONE, citizens of the United States, residing, respectively, at Hartford, in the county of Hartford and State of Connecticut, and at New Rochelle, in the county of Westchester and State of New York, have invented new and useful Improvements in Processes of Manufacturing Gas from Wood, of which the following is a specification.

This invention relates to the manufacture of a fixed, high-grade producer-gas and water-gas from wood in a gas generating apparatus in which air is drawn down into the body of ignited wood, and the resulting fixed gas is drawn off by an exhauster from the generators.

The object of our invention is to provide for effectively and economically generating fixed producer-gas, or producer-gas and water-gas, from wood in a cupola generating apparatus.

By numerous practical tests we have found that it is difficult and impracticable to maintain a uniform and suitable fuel bed in a cupola generator by using wood alone for the fuel, that will produce a constant and uniform quality of gas; and further, that it is of great advantage to maintain a layer of coke or hard coal, two or three feet in depth on the grate, for decomposing the volatile hydrocarbon matter from the wood and converting carbonic acid into carbon monoxid. The layer of incandescent hard coal or coke rectifies any inequalities of the gas caused by variations in the fuel bed formed by the wood. Only the minimum proportion or quantity of hard coal or coke is consumed, as the oxygen in the air is consumed by passing through the flaming wood and charcoal above the body of coke.

During the manufacture of gas a large volume of volatile vapors, containing carbonaceous matter, is given off from the ignited wood and a sufficient quantity of charcoal is formed to cause most of the reactions whereby the carbon dioxid is converted into carbon monoxid, and principally for this reason very little of the specially prepared and uniform body of hard carbon is consumed in the operation. The office of the body of hard coal or coke is mainly to form a uniform and regulated body of carbon, free from large interstices and open spaces through which undecomposed vapors and carbon dioxid would escape without proper decomposition and conversion into fixed combustible gas.

The following is the actual record of one plant, for one month, running twenty-four hours a day:

Wood used _____ 982,200 pounds.
Coke used _____ 8,055 pounds.

We will now describe our process in detail by reference to the accompanying drawings, in which,—

Figure 2:
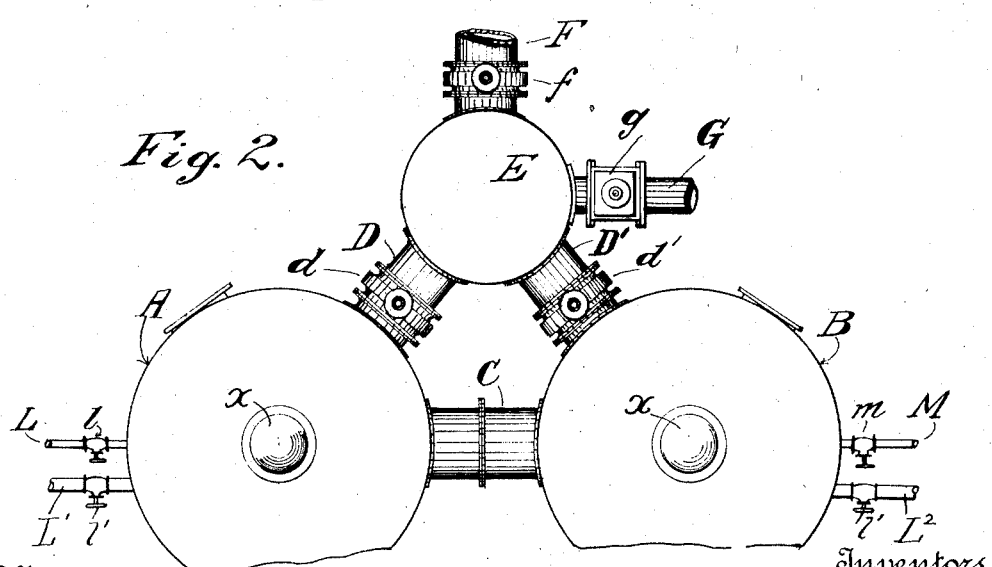

Figure 1 represents a vertical section of two connected gas generators and an elevation of a tubular boiler. Fig. 2 represents a top plan view of the same. Fig. 3 represents a rear elevation of the two connected gas generators, the tubular boiler and an exhauster, with parts in section.

In carrying out the process we preferably use a gas generating apparatus consisting of two cupola generators A and B, connected at the top by a pipe or flue C, and connected at the base or ash-pit by the gas outlet pipes D and D', having valves $d$ and $d'$, with the base of the tubular steam boiler E. The boiler E is constructed with the usual gas chambers or smoke boxes, $m^2$ and $m^3$, at top and bottom, and a gas outlet pipe F, having a valve $f$, connects with the top gas chamber and leads to an exhauster W, as shown in Fig. 3. A scrubber, or other gas cleaning apparatus, (not here shown), may be interposed between the boiler E and the exhauster. A gas outlet pipe G, having a valve $g$, also connects with the upper gas chamber of the boiler and may lead to a separate holder. Water-gas, when made, may be passed through said pipe G or the outlet pipe F, through the exhauster to the holder for producer-gas. The generators A and B are provided with grates $b$, preferably composed of brick arches, and ash-pits X.

A steam supply pipe L, having a valve $l$, connects with the base or ash pit of generator A, and a similar steam pipe M, having a valve $m$, connects with the base or ash pit of generator B. Pipes L', L² having a valve $l'$ for admitting air or gaseous fluid, under pressure, may also connect with the ash-pit of each generator; or the air, or gaseous fluid may be admitted through said pipes L and M.

In operating the apparatus we preferably first place a layer, two or three feet in depth, of good coke or hard coal K upon the grates b and kindle wood fires on top of such beds of coke, and continue to charge wood as required. The exhauster being in operation and the lids x being partly open, air will be drawn down into the wood, causing combustion of the same, and the resulting producer-gas, containing aqueous and hydrocarbon vapors and carbonic acid, will be passed down through the body of incandescent coke K, where the vapors are decomposed into hydrogen, carbureted hydrogen, and carbon monoxid, and the carbonic acid which is first made is converted into carbon monoxid. The flame and hot products from the wood, passing downward will highly heat the body of coke K and maintain it at a suitable temperature for causing the above stated reactions. Very little of the body of coke K will be consumed since no free oxygen is admitted to it. The coke, however, remains a uniform incandescent body, permitting the gases and vapors to pass freely through the interstices throughout the whole cross area of the generator. The fresh charges of wood I are gradually reduced to charcoal J and then to ashes, which together with fine charcoal gradually plug the interstices in the body of coke K. In order to clean the fires and keep them in good condition steam is occasionally admitted under pressure and, preferably, in impulses into the bases of the generators, or directly into the body of hard coal or coke K for blowing the fine carbon and ashes out of the interstices of the fuel and for making water-gas. In blowing with steam and thus making water-gas one of the valves, as d, is closed and steam is admitted through valve l to the base of the generator A, and is passed thence up into the body of incandescent fuel where decomposition is effected. The blast of steam drives the fine charcoal and ash out of the body of coke K and charcoal J, causing them to accumulate upon the sides of the generator, as indicated at T. The water-gas made in the generator A passes therefrom through the pipe connection C and thence down through the fuel in generator B, where all the vapors are converted into fixed gas by final passage through the body of incandescent coke K. The water-gas may be drawn off by the exhauster W, or may pass off through pipe G to a separate holder. When it is desired to again blow out ashes and make water-gas, the valve d' will be closed and valve d will be opened, and steam admitted through valve m into the base of generator B, and the resulting water-gas will pass down through the body of fuel in generator A and thence through the boiler E. The fires are thus kept in like uniform condition. This occasional manufacture of water-gas is advantageous, for the reason that air cannot be drawn continuously down through the bodies of fuel as the resistance greatly increases, probably due to the fact that the interstices in the lower strata of fuel become plugged or filled with fine ash and charcoal. The blast of steam will blow out this dust and ashes, causing it to accumulate upon the sides of the generators, as shown at T. After operating the generators from four to six days it is found best to clean them by entirely removing the hard coal or coke and then cleaning out the wood ashes. The coke after having been separated from the ashes is then put back on to the grate, wood fires again kindled and the process of manufacturing gas from wood resumed, as above described.

In manufacturing gas from wood the course of the producer-gas through the generators may be similar to that above described for water-gas, and the operation may be conducted as follows: The wood being ignited and the coke K heated to incandescence in both of the generating chambers A and B, one of the valves, as d, is closed, while valve d' is opened. Air may now be admitted by a pipe L' having a valve l' into the base of generator A and passed up through the body of burning and distilling wood therein, resulting in the production of producer-gas and aqueous and hydrocarbon vapors distilled from the wood. This mixed gas and vapor is then passed through pipe C and thence down through the body of wood and incandescent hard carbon in generator B where decomposition of the vapors is effected and carbonic acid converted into carbon monoxid. The resulting fixed gas passes off at the bottom through pipe D', thence up through the boiler F and the exhauster to the holder. While air is being drawn up into the generator A and producer-gas made in said generator, the lids x of generator B may be partly open, admitting air into the top of generator B. In this case the gas and vapors from generator A and air will be passed down through the incandescent fuel in generator B. When desired, the above described operation may be reversed, that is, air first admitted into the base of generator B and the gases and vapors passed down through the incandescent fuel in generator A and thence through the boiler and exhauster. While making gas with an updraft of air that generator into which the air is admitted may be frequently and principally charged with fresh wood, while the body of incandescent coke and charcoal is maintained in the other generating chamber for decomposing and fixing the gas and vapors.

When it is desired to blow ashes and fine charcoal out of the interstices in the body of hard carbon K a counterblast of air, carbonic acid, or products of combustion may be used instead of steam, and such blasts of aeriform fluid should be under pressure and admitted in sudden impulses, sufficiently strong to blow the ashes and fine charcoal out of the incandescent hard carbon and cause it to accumulate on the sides of the generator as indicated at T.

A vacuum gage, not here shown, will preferably be placed on the outlet of each generator, as on the pipes D, D', or on the outlet pipe F leading from the boiler, for indicating the vacuum in the generators and the condition of the fire. This vacuum gage will indicate when the bodies of hard carbon K have become plugged with ashes, fine charcoal, or lamp black, and the fire will then be cleaned as above described.

Having described our invention, what we claim, and desire to secure by Letters Patent, is—

1. The process of making fixed producer gas from wood which consists in placing in the base of a cupola a regulated body of hard carbon, then igniting and burning a body of wood on top of the hard carbon, drawing the resulting flame down through the hard carbon and heating it to incandescence, feeding wood as required and drawing air down into the body of wood and drawing the resulting flame, hot gas and vapors down through said body of incandescent hard carbon, thereby converting the vapors and carbonic acid into fixed combustible gas.

2. The process of making wood gas which consists in burning a body of wood on top of a body of incandescent hard carbon, drawing air down into the wood, and the resulting flame, gas and vapors down through the incandescent hard carbon, and at suitable intervals blowing out ash and fine charcoal from the interstices of the fuel by a blast of aeriform fluid.

3. The process of making wood gas which consists in burning a body of wood on top of a body of hard carbon, heating the same to incandescence, drawing air down into the wood, and the resulting flame, gas and vapors down through the hard carbon, thereby converting the vapors and carbonic acid into fixed combustible gas, and at suitable intervals blowing out ash and fine charcoal from the interstices of the fuel by a counterblast of steam, aeriform, or gaseous fluid, forced in the reverse direction through the fuel.

4. The process of making wood-gas which consists in placing bodies of hard carbon, such as hard coal or coke, on the grates or bases of two cupola generating chambers, then igniting and burning bodies of wood on top of the bodies of hard carbon, drawing the resulting flame through said hard carbon and heating it to incandescence, feeding wood as required, and drawing air down into the wood, and the resulting flame, gas and vapors down through the bodies of incandescent hard carbon, thereby converting the vapors and carbonic acid into fixed combustible gas, at suitable intervals shutting off the air at the top, and closing the gas outlet-pipe at the base of one chamber and then blowing ash and fine carbon, by a counterblast, out of the interstices of the fuel in said chamber and drawing the resulting gases down through the incandescent fuel in the adjacent chamber.

In testimony whereof we have signed our names to this specification in the presence of two subscribing witnesses.

BURDETT LOOMIS.
HAWLEY PETTIBONE.

Witnesses:
LEWIS B. BUDD,
W. D. MORRIS.